(12) United States Patent
Walker et al.

(10) Patent No.: US 6,227,972 B1
(45) Date of Patent: *May 8, 2001

(54) METHOD AND APPARATUS FOR EXPIRATION OF PREPAID SLOT MACHINE PLAYS

(75) Inventors: Jay S. Walker, Ridgefield; James A. Jorasch, Stamford; Andrew S. Van Luchene, Norwalk, all of CT (US)

(73) Assignee: Walker Digital, LLC

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/886,584

(22) Filed: Jul. 1, 1997

(51) Int. Cl.[7] .............................. A63F 9/24; G06F 15/28
(52) U.S. Cl. ............................... 463/25; 463/20; 705/14; 235/380
(58) Field of Search .................................... 463/1, 25–27, 463/16, 20, 36, 40–42, 12–13; 273/138.2, 139, 143 R, 292; 235/375, 380; 705/14, 16–18, 20, 35, 38, 44; 700/91, 93; 340/5.2–5.24, 5.8, 825

(56) References Cited

U.S. PATENT DOCUMENTS

| | | |
|---|---|---|
| 4,764,666 | 8/1988 | Bergeron . |
| 5,038,022 | 8/1991 | Lucero . |
| 5,056,019 | 10/1991 | Schultz et al. . |
| 5,179,517 | 1/1993 | Sarbin et al. . |
| 5,231,568 * | 7/1993 | Cohen et al. ........................... 463/43 |
| 5,265,874 | 11/1993 | Dickinson et al. . |

(List continued on next page.)

OTHER PUBLICATIONS

Mea Andrews, Casinos Drop Deal, Business Dateline, Feb. 11, 1995, (Section B) at 1.

(List continued on next page.)

*Primary Examiner*—Mark Sager
(74) *Attorney, Agent, or Firm*—Steven M. Santisi

(57) ABSTRACT

An expiring prepaid casino card is disclosed which may be utilized to provide payment for slot machine play or other gambling activities. The disclosed expiring prepaid casino card is preferably a pointer to a monetary amount stored in a casino prepaid card database, that expires in predefined expiration amounts over each of a plurality of predefined expiration periods. If a player does not utilize the entire predefined expiration amount, for a given predefined expiration period, the remaining balance on the expiring prepaid casino card allocated for the expiration period automatically expires and does not roll over into any subsequent expiration periods. The expiring prepaid casino card may alternatively be embodied as a smart card or a general-purpose debit card programmed with the predefined expiration amounts for each predefined expiration period, or a cardless electronic key or personal identification number (PIN) which may be utilized to access data records which have been programmed with the predefined expiration amounts for each predefined expiration period. The expiring prepaid casino card can preferably be (i) purchased by the player at face value, or at a discount; (ii) given out by the casino to a player for free as part of a promotion, or to preferred players; or (iii) issued to a player as part of a payout on a slot machine. In this manner, the player is incented to make return visits to a casino to access each predefined expiration amount for each predefined expiration period. The predefined expiration amounts and expiration periods do not have to be fixed units. Slot machine jackpots can be awarded in the form of an increased total balance on the expiring prepaid casino card that expire in predefined expiration amounts over predefined expiration periods. The expiring prepaid casino card can preferably be programmed with one or more further restrictions or requirements that the player must satisfy before any expiration amounts can be accessed.

56 Claims, 11 Drawing Sheets

U.S. PATENT DOCUMENTS

| | | |
|---|---|---|
| 5,277,424 | 1/1994 | Wilms . |
| 5,321,241 | 6/1994 | Craine . |
| 5,353,335 | 10/1994 | D'Urso et al. . |
| 5,370,306 * | 12/1994 | Schulze et al. .......................... 463/25 |
| 5,373,440 * | 12/1994 | Cohen et al. ........................... 463/43 |
| 5,397,883 | 3/1995 | Miyashita . |
| 5,429,361 | 7/1995 | Raven et al. . |
| 5,533,727 * | 7/1996 | DeMar ................................... 463/25 |
| 5,559,312 | 9/1996 | Lucero . |
| 5,655,961 * | 8/1997 | Acres et al. ............................ 463/42 |
| 5,876,284 * | 3/1999 | Acres et al. ............................ 463/25 |

OTHER PUBLICATIONS

AT&T, NBA Team Up for Official PrePaid Card of the NBA; Twenty–nine Card Set to Feature 21 Current or Former NBA All–Stars, Business Wire, Apr. 7, 1997.

Bet On It: The Smart Card is Rolling Into The International Gaming Industry, IAC Newsletter Database, Feb. 19, 1996.

Card Briefs: Stored Value Card Designed for Casinos, The American Banker, Oct. 31, 1995, at 23.

Angela Curry, How to Navigate Through a World of Prepaid Phone Cards, The Kansas City Star, Mar. 25, 1996, (FYI) at D4.

Richard Grimes, Player Cards at West Virginia Racetracks OK'd: Innovation Keeps Track of Winnings Like Frequent Flier Cards, Charleston Daily Mail, Mar. 28, 1997, (News) at 6A.

David Holley, Perils and Profits of Pachinko Passion; Japan's Love for Pinball Fuels Revenue That Tops the Nation's Worldwide Auto Sales. But It Also Created 'Pachinkoholics' and a Plague of Social Problems, Los Angeles Times, Oct. 24, 1996, (Part A) at 1.

Kathy M. Kristof, Investments, Guides Provide Ongoing Gifts, The Dallas Morning News, Dec. 23, 1996, (Business) at 1D.

Karin Laub, Taking a Ride on the 'Gamblers Express' to Atlantic City, The Associated Press, Jul. 31, 1984, (Domestic News).

Peter Mattiace, The Associated Press, Mar. 28, 1989, (Domestic News).

MCI, Get Up To 6 Hours of Free Long Distance Calling From MCI, American Express Card Statement Promotion (May 1997).

Dana Norton, They've Got Your Number; Prepaid Calling Cards Convenient But Not Always Cheap, The Boston Herald, Oct. 29, 1995, (Lifestyle) at 054.

Kathyrn O'Sullivan, Plastic Silences Pokies, The Evening Post, Dec. 10, 1996, (News, National) at 16.

L. Maxine Sanford, Cash in on Calling Cards, Home Office Computing, Jun. 1995.

* cited by examiner

| DATE ACCOUNT OPENED 510 | CARD NUMBER 512 | PLAYER TRACKING ID NUMBER 514 | TOTAL CURRENT VALUE 516 | EXPIRATION AMOUNT PER EXPIRATION PERIOD 518 | EXPIRATION PERIOD DURATION 520 | BALANCE REMAINING FOR CURRENT EXPIRATION PERIOD 522 | BALANCE RESET DATE 524 | RESTRICTION FIELD 526 | PLAY REQUIREMENTS TO ACCESS BALANCE 530 |
|---|---|---|---|---|---|---|---|---|---|
| 5/19/97 | 456789 | 321234 | $90 | $10 | 1 WEEK | 0 | 5/26/97 | MONDAY-THURSDAY | WAGER $50 |
| 5/20/97 | 456790 | 331567 | $45 | $5 | 1 DAY | $5 | 5/21/97 | NONE | PLAY 1 HOUR |
| 5/01/97 | 456791 | UNASSIGNED | $200 | $20 | 1 MONTH | $20 | 6/01/97 | 10AM-2PM | NONE |

FIG. 5A

METHOD AND APPARATUS FOR EXPIRATION OF PREPAID SLOT MACHINE PLAYS

FIELD OF THE INVENTION

The present invention relates generally to prepaid casino cards, and more particularly, to prepaid casino cards that expire in predefined amounts over predefined periods of time.

BACKGROUND OF THE INVENTION

Slot machines, including video poker, video keno or video blackjack (hereinafter, collectively referred to as "slot machines") are an important source of income for the gambling industry. Accordingly, casinos constantly search for new gaming strategies and features to provide additional incentives for slot machine players to continue play and to distinguish their slot machines from competitors in the industry. For example, as an added incentive to play slot machines and to increase customer loyalty, many casinos offer "slot club" programs to reward slot machine players. Each player in a slot club is generally issued a player tracking card encoded with his identification number. The casino awards "player reward points" for the player as he plays slot machines in that casino. The "player reward points" can generally be redeemed for merchandise or services at the casino hotel. In many cases, however, these incentives may not be sufficient to attract new players or to retain existing casino players at slot machines.

While such slot clubs were initially successful in building customer loyalty, it has been found that conventional slot clubs have now become only a secondary consideration when a player is selecting a casino to frequent, in view of the availability of virtually indistinguishable slot clubs at most casinos. Generally, a customer can join a slot club at practically any selected casino, with each slot club offering similar programs to reward slot machine play. Thus, for many players, a slot club does not provide a sufficient novelty to incent players to return to a particular casino.

In order to attract new customers and build customer loyalty, many casinos offer "bus packages" to customers, which include transportation to the casino. Typically, customers pay a fee for such packages, with at least a portion of the fee generally being returned to the customer upon arrival at the casino, in the form of food coupons and coins or tokens which may be used for slot machine play. In addition, such "bus packages" typically include a coupon, good for a predefined period of time, which permits the customer to obtain additional money, if the customer makes a return trip to the casino. Typically, however, casinos have no way to ensure that a monetary amount provided to a "bus package" customer for slot machine play is actually spent in the casino.

Traditionally, players obtained coins or tokens for slot machine plays from clerks who circulated through the casino or from cashiers at centralized booths. When players ran out of coins, they were thus required to return to the cashier for more coins, and thereby risk losing their position at a particular slot machine, or otherwise await the return of a circulating clerk. In order to increase customer convenience, as well as casino revenues, a number of casinos have recently introduced proprietary prepaid casino cards that permit cashless gambling. U.S. Pat. No. 5,265,874, entitled "Cashless Gaming Apparatus and Method," to Dickinson et al. and assigned to International Game Technology (IGT), discloses one such cashless gaming system suitable for casinos.

Generally, such cashless gaming systems allow players to provide a form of payment to a clerk and obtain a prepaid casino card, encoded with an identification number. An account, identified by the identification number, is typically created in a centralized database with the appropriate balance. Thereafter, the player selects a slot machine and inserts the prepaid casino card in a card reader provided on the slot machine. The card reader retrieves the player' identification number from the prepaid casino card, and the previously stored cash amount is retrieved from the central database and downloaded to the selected slot machine. The player may then play the selected slot machine for as long as the player desires, until the previously stored cash amount is depleted.

In addition, with conventional prepaid casino cards, any money which a customer places on a prepaid card is generally available to the customer, as desired, and thus the customer is not required to make a return trip to the casino to access further portions of the available balance. U.S. Pat. No. 5,321,241, entitled "System and Method for Tracking Casino Promotional Funds and Apparatus For Use Therewith," to Craine (the "Craine Patent"), for example, discloses a system that permits a casino to ensure that monetary amounts provided to a customer as part of a promotion are actually spent in the casino. The Craine Patent suggests varying or throttling the amount of money per hour that can be credited against a prepaid casino card for gambling on the slot machines. In this manner, a player can be limited to a predefined amount of money to spend in the casino within predefined time periods. The total balance on the prepaid card may expire on a given date, at the discretion of the casino. The system disclosed in the Craine Patent does not incent a player to make return trips to a casino, but rather, it incents the player to stay longer at the casino on any given visit.

As apparent from the above-described deficiencies with conventional casino loyalty programs, a need exists for a prepaid casino card system that incents a player to make return visits to a casino. A further need exists for a prepaid casino card system that provides flexible alternatives for providing players with fixed or variable expiration amounts over fixed or variable expiration periods, to suit various casino objectives and to permit the casino to implement numerous casino promotions. Yet another need exists for a casino prepaid card ail system that permits players to budget their spending. In addition, a further need exists for a casino loyalty program that stimulates business in a casino during off-peak periods. A further need exists for a prepaid casino card system that provides a monetary amount that expires in predefined expiration amounts over a plurality of expiration periods, thereby leaving any expiration amounts which are forfeited by the player as breakage (profits) for the casino.

SUMMARY OF THE INVENTION

Generally, according to one aspect of the invention, a player of a slot machine can as utilize an expiring prepaid casino card to provide payment for slot machine play or other gambling activities. The expiring prepaid casino card is preferably a pointer to a monetary amount stored in a casino prepaid card database that expires in predefined expiration amounts over each of a plurality of predefined expiration periods. In an alternate implementation, the expiring prepaid casino card may be embodied as a smart card or a general-purpose debit card programmed with the predefined expiration amounts for each predefined expiration period, or a cardless electronic key or personal identification number (PIN) which may be utilized to access data records which have been programmed with the predefined expiration amounts for each predefined expiration period.

According to a further feature of the present invention, the expiring prepaid casino card provides a casino with a number of flexible alternatives for providing players with fixed or variable expiration amounts over fixed or variable expiration periods, as desired, to suit various casino objectives and to permit the casino to implement numerous casino promotions. The expiring prepaid casino card can preferably be (i) purchased by the player at face value, or at a discount; (ii) given out by the casino to a player for free as part of a promotion, or to preferred players; or (iii) issued to a player as part of a payout on a slot machine.

If a player does not utilize the entire predefined expiration amount, for a given predefined expiration period, the remaining balance on the expiring prepaid casino card allocated for the expiration period automatically expires and does not roll over into any subsequent expiration periods. In this manner, the player is incented to make return visits to a casino to access each predefined expiration amount for each predefined expiration period. In an alternative implementation, the player can be permitted a predefined number of excused absences over the expected life of the expiring prepaid casino card. For example, a player may obtain an expiring prepaid casino card which provides the player with predefined fixed expiration amounts for six individual months within a seven month period, thereby permitting an unused balance to carry over one month.

According to another aspect of the invention, the predefined expiration amounts or expiration periods do not have to be fixed units. A player can be issued an expiring prepaid casino card, for example, with a total value to be utilized in predefined variable monetary increments over predefined fixed or variable expiration periods. In various embodiments, the particular predefined variable expiration amounts which a player can access on the expiring prepaid casino card in a given expiration period can be (i) based on the time of day, week or month, in which the expiration amount was accessed, or (ii) randomly allocated among each of the several predefined expiration periods to obtain access to different expiring amounts for each expiration period. In addition, a player can have one or more predefined fixed expiration amounts increased by bonus amounts randomly awarded to one or more players from among the whole range of issued expiring prepaid casino cards. Similarly, a casino can offer bonus amounts to individual players based on past performance.

The expiring prepaid casino card can preferably be programmed with one or more further restrictions or requirements that the player must satisfy before any expiration amounts can be accessed. For example, a player may be required to (i) play a certain amount of money on a given slot machine, (ii) play a certain number of handle pulls, or (iii) play for a predefined period of time, before any predefined expiration amounts may be accessed. Likewise, a player can be denied access to available balances until one or more external events are satisfied, including, for example, particular weather conditions, particular stock market conditions, or particular casino utilization thresholds, for example, when fewer than thirty percent (30%) of the slot machines were being utilized. In addition, the expiring prepaid casino card can be programmed with further restrictions requiring the player to wager any predefined expiration amounts which were given out by a casino for free, or purchased by a player at a discount, and thereby prevent the player from cashing out such credits.

A more complete understanding of the present invention, as well as further features and advantages of the present invention, will be obtained by reference to the following detailed description and drawings.

BRIEF DESCRIPTION OF THE DRAWINGS

FIG. 4b shows a rear view of the illustrative prepaid slot card of FIG. 4a;

FIG. 5a illustrates a sample table from the prepaid card database of FIG. 2;

DETAILED DESCRIPTION

Figure 1:
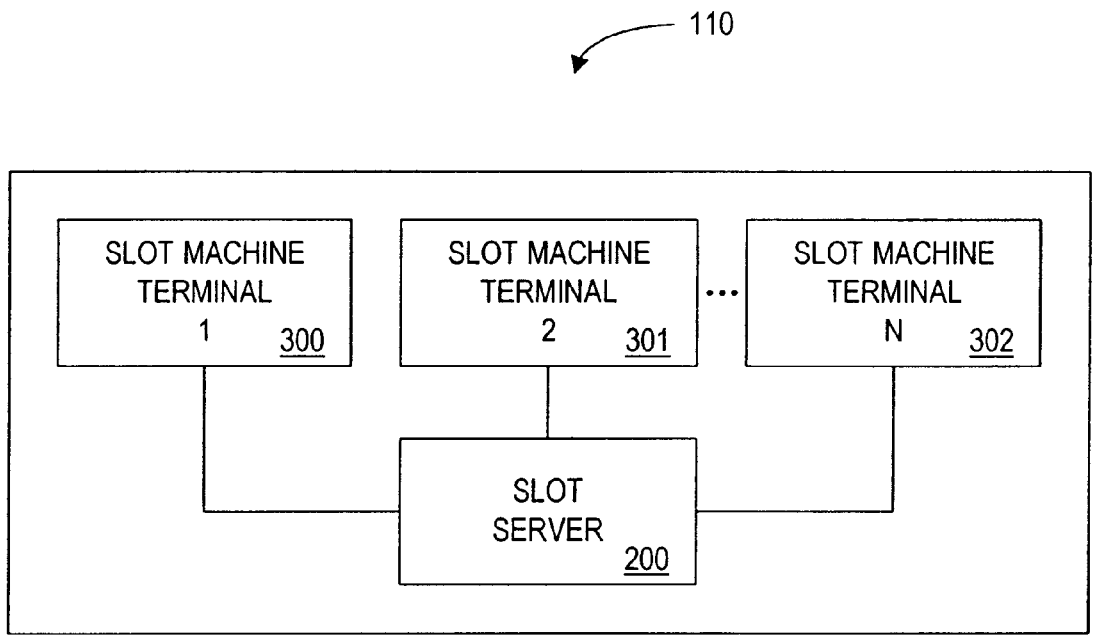
FIG. 1 is a schematic block diagram illustrating a suitable communications network for interconnecting one or more electronic gaming devices, such as slot machines, with a slot server.

FIG. 1 shows an illustrative network environment within a casino 110 for transferring information between one or more slot machines 300–302 and a slot server 200. According to a feature of the present invention, a player of a slot machine, such as the slot machine 300, can utilize an expiring prepaid casino card 400, shown in FIGS. 4a and 4b, to provide payment for slot machine play or other gambling activities. The expiring prepaid casino card 400 is preferably a pointer to a monetary amount stored in a casino prepaid card database 500, discussed below, that expires in predefined expiration amounts over each of a plurality of predefined expiration periods. In an alternate implementation, the expiring prepaid casino card may be embodied as a smart card or a general-purpose debit card programmed with the predefined expiration amounts for each predefined expiration period, or a cardless electronic key or personal identification number (PIN) which may be utilized to access data records which have been programmed with the predefined expiration amounts for each predefined expiration period. According to a further feature of the present invention, discussed hereinafter, the expiring prepaid casino card 400 preferably provides a casino 10 with a number of flexible alternatives a for providing players with fixed or variable expiration amounts over fixed or variable expiration periods, as desired, to suit various casino objectives and to permit the casino 100 to implement numerous casino promotions.

For example, a player may obtain an expiring prepaid casino card 400 with a total value of $30.00, which provides the player with predefined fixed expiration amounts of $10.00 per day for each day of a three day vacation. It is noted that the expiring prepaid casino card 400 can preferably be (i) purchased by the player at face value, or at a discount; (ii) given out by the casino 110 to a player for free as part of a promotion, or to preferred players; or (iii) issued to a player as part of a payout on a slot machine 300. In addition, a player can preferably recharge the expiring prepaid casino card 400 by inserting the card 400 into a slot machine 300, or a central card processing facility, and providing a form of payment, for example, by depositing one or more coins, or inserting a credit card, debit card or smart card, or utilizing stored credits awarded for slot machine play.

In a preferred embodiment, if the player does not utilize the entire predefined expiration amount, for a given predefined expiration period, the remaining balance on the expiring prepaid casino card 400 allocated for the expiration period automatically expires and does not roll over into any subsequent expiration periods. In this manner, the player is incented to make return visits to a casino 110 to access each predefined expiration amount for each predefined expiration period. Alternatively, the player can be permitted a predefined number of excused absences over the expected life of the expiring prepaid casino card 400. For example, a player may obtain an expiring prepaid casino card 400 with a total value of $60.00, which provides the player with predefined fixed expiration amounts of $10.00 per month for six individual months within a seven month period, thereby permitting an unused balance to carry over one month.

According to a further feature of the invention, the predefined expiration amounts and expiration periods do not have to be fixed units. A player can be issued an expiring prepaid casino card 400, for example, with a total value of $100.00, to be utilized in predefined variable monetary increments over six monthly expiration periods. For example, the total value of an expiring prepaid casino card 400 can be distributed over each monthly expiration period such that the player can access $10.00 the first month, with incremental monthly increases over each subsequent month until the player can access $25.00 for the final sixth month.

In a variation of this embodiment, the predefined expiration amounts can be incremental, increasing in a predefined progression over the total expiration period, regardless of whether the player actually utilizes the expiring prepaid casino card 400 for each expiration period. Thus, if the predefined progression for a given expiring prepaid casino card 400 is $10.00, $15.00 and $25.00 for each month which the player utilizes the expiring prepaid casino card 400 within a three month period, and the player fails to access an expiring balance for the second month, then the expiring amount which the player can access in the third month is limited to $15.00. Thus, the player never reaches the maximum expiration amount of $25.00 which the player would have been entitled to had the player frequented the casino 110 for each of the three months. In this manner, the player is incented to frequent the casino consistently. In another embodiment, the particular variable expiration amounts which a player can access on the expiring prepaid casino card 400 in a given expiration period can be based on the time of day, week or month, in which the expiration amount was accessed. For example, the card 400 could provide a balance of $10.00 if accessed during predefined peak playing hours or $15.00 for off-peak hours.

In yet another variation of the variable expiration amount embodiment, variable expiration amounts can be randomly allocated to predefined expiration periods. For example, an expiring prepaid casino card 400 having an initial total value of $50.00 can be defined to provide a player with predefined expiration amounts of $10.00 for two days of a three-day vacation and $30.00 for a third day. The casino 110, however, can randomly select the particular day on which the expiring prepaid casino card 400 has a $30.00 value. In this manner, since the player is not sure which day of the three day expiration period will permit the player to access the $30.00 expiration amount, the player will frequent the casino to ensure that the player does not miss the day with the greater expiration amount on the expiring prepaid casino card 400. In addition, if the player has purchased the expiring prepaid casino card 400, the player may forfeit the remaining expiration amounts, once the greater value day has passed, thus leaving any remaining expiration amounts as breakage (profits) for the casino 110. According to a further feature of the invention, the randomness of the variable expiration amounts can occur over the whole range of issued expiring prepaid casino cards 400, as opposed to an individual expiring prepaid casino card 400. In other words, each expiring prepaid casino card 400 can be programmed to allocate predefined expiration amounts over each of a plurality of predefined expiration periods. In addition to the predefined expiration amount for a given expiration period, one or more expiring prepaid casino cards 400 can be randomly awarded bonus amounts. Thus, the player has a chance to earn credits in addition to those that could normally be accessed during each predefined expiration period. The added excitement of an additional chance to win a bonus expiration amount, may incent such players to frequent the casino 110 offering such an expiring prepaid casino card 400. Similarly, a casino 110 can offer bonus amounts to individual players based on past performance. In other words, a player can be entitled to access a $10.00 per day expiration amount for each day of a five-day vacation. If, however, the casino 110 determines that the player consistently utilized the card and was a high volume customer, or has otherwise complied with casino-defined criteria, the player could be awarded a higher expiration amount for each subsequent day.

In another variation, jackpots awarded based on slot machine play funded by amounts accessed through an expiring prepaid casino card 400 can be awarded in the form of an increased total balance on the expiring prepaid casino card 400 that expires in predefined expiration amounts over predefined expiration periods. For example, if a player wins a $1,000.00 jackpot while playing the slot machine 300, the slot server 200 can offer the player an option to receive an enhanced jackpot amount of $1,200.00, which may be accessed by the player in predefined $200.00 expiration amounts over each of six predefined monthly expiration periods. In this manner, the jackpot is awarded through the expiring prepaid casino card 400, with no money leaving the casino 110, rather than as a cash payout.

The expiring prepaid casino card 400 can preferably be programmed with one or more further restrictions or requirements that the player must meet before any expiration amounts can be accessed. For example, a player may be required to (i) play a certain amount of money on a given slot machine 300, (ii) play a certain number of handle pulls, or (iii) play for a predefined period of time, before any predefined expiration amounts may be accessed. Likewise, a player can be denied access to available balances until one or more external events are satisfied, including, for example, particular weather conditions, particular stock market conditions, or particular casino-utilization thresholds, for example, when fewer than thirty percent (30%) of the slot machines 300 were being utilized.

In order to prevent players from cashing out expiration amounts which were given out by a casino for free, or purchased by the player at a discount, and thereby defeat the casino's motivation for issuing such discounted prepaid casino cards to encourage slot machine players to continue playing after utilizing the predefined expiration amounts, the slot machine preferably requires the player to wager the credits associated with the predefined expiration amounts. In order to keep the predefined expiration amounts separate from conventional credits, the slot machine and the slot server would preferably track the credits associated with a predefined expiration amount in a separate account, or in a database field which is separate from the conventional credit field. In this manner, individuals are prevented from exploiting the system by cashing out credits from the card which were obtained for free or at a discount off the face value.

As used herein, the term "slot machine" refers to any programmable gaming terminal controlled by a random or pseudo-random event in which one or more players can wager on the outcome of the event, including traditional slot machines, video bingo, video keno, video poker and video blackjack devices. In addition, the term "slot machine" includes any device capable of issuing a tangible embodiment of a wager, such as chips, tokens, betting slips, betting tickets or bingo cards, in exchange for credits on a prepaid casino card 400. The slot server 200 and the slot machine 300, discussed further below in conjunction with FIGS. 2 and 3, respectively, may comprise conventional hardware and software, as modified herein to carry out the functions and operations described below. The slot server 200 and slot machine 300 transmit digitally encoded data and other information between one another. The transmitted data and other information may represent player name and identification number, play results, authenticated player identification, player requests to access an expiration amount from an expiring prepaid casino card 400, and any associated restrictions which the player must satisfy in order to access the expiration amount. The communications links between the slot server 200 and each slot machine, such as slot machine 300, preferably comprise cable or wireless links on which electronic signals can propagate.

Figure 2:
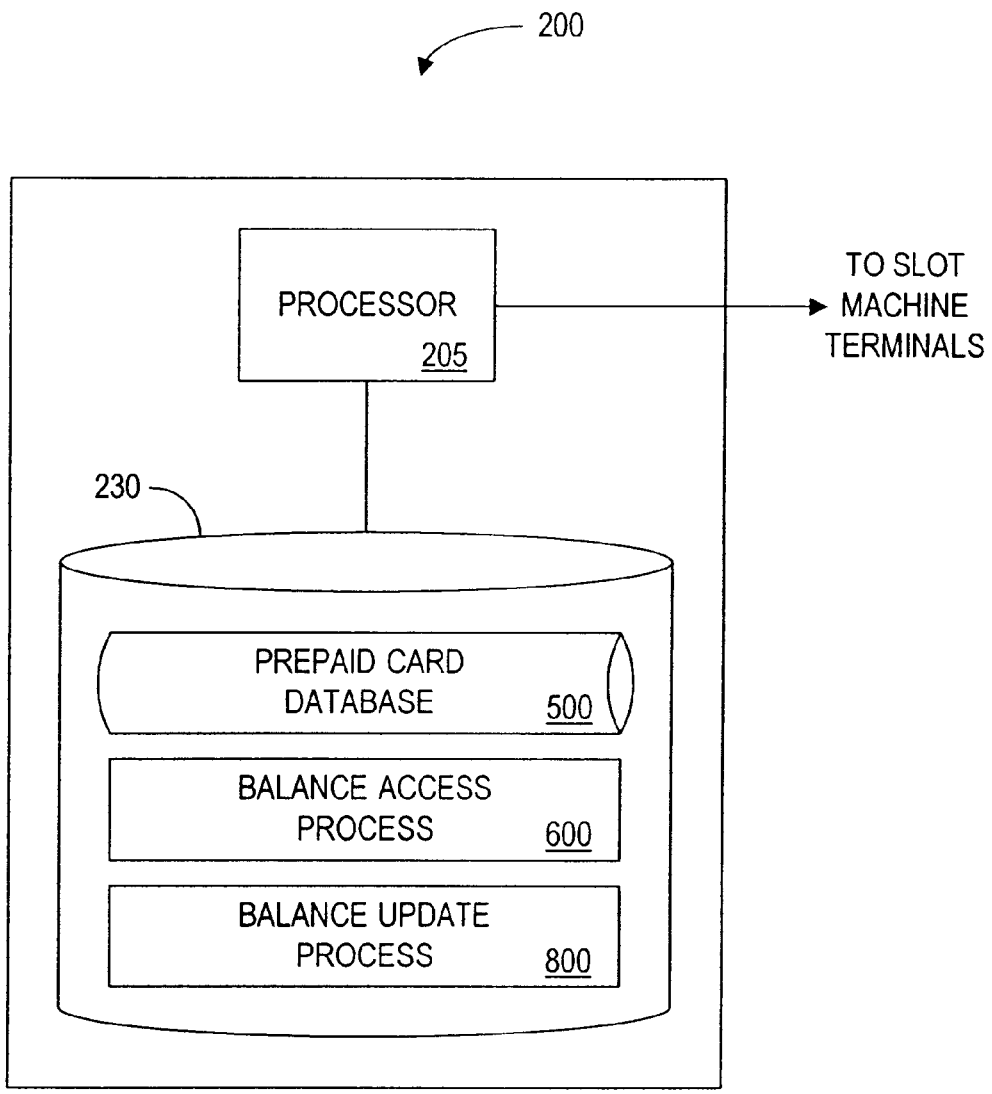
FIG. 2 is a schematic block diagram of the slot server of FIG. 1.

FIG. 2 is a block diagram showing the architecture of an illustrative slot server 200. The slot server 200 may be embodied, for example, as an RS 6000 server, manufactured by IBM Corp., as modified herein to execute the functions and operations of the present invention. The slot server 200 preferably includes a processor 205 and related memory, such as a data storage device 230. The processor 205 may be embodied as a single processor, or a number of processors operating in parallel. The data storage device 230 and/or a read only memory (ROM) are operable to store one or more instructions, which the processor 205 is operable to retrieve, interpret and execute. The processor 205 preferably includes a control unit, an arithmetic logic unit (ALU), and a local memory storage device, such as, for example, an instruction cache or a plurality of registers, in a known manner. The control unit is operable to retrieve instructions from the data storage device 230 or ROM. The ALU is operable to perform a plurality of operations needed to carry out instructions. The local memory storage device is operable to provide high-speed storage used for storing temporary results and control information.

As discussed further below in conjunction with FIGS. 5a and 5b, the data storage device 230 preferably includes a prepaid card database 500. The prepaid card database 500 preferably includes account information for each prepaid casino card 400, including the total account balance and predefined expiration amounts for each expiration period. In addition, as discussed below in conjunction with FIGS. 6 and 8, respectively, the data storage device 230 preferably includes a balance access process 600 and a balance update process 800. Generally, the balance access process 600 receives requests from a player to access a balance associated with a prepaid casino card 400 and releases a predefined expiration amount to a player, if available for the current expiration period, provided any associated restrictions have been met. The expiring balance update process 800 preferably causes any remaining expiration amount associated with the expiring prepaid casino card 400 to automatically expire if not utilized within the predefined expiration period.

Figure 3:
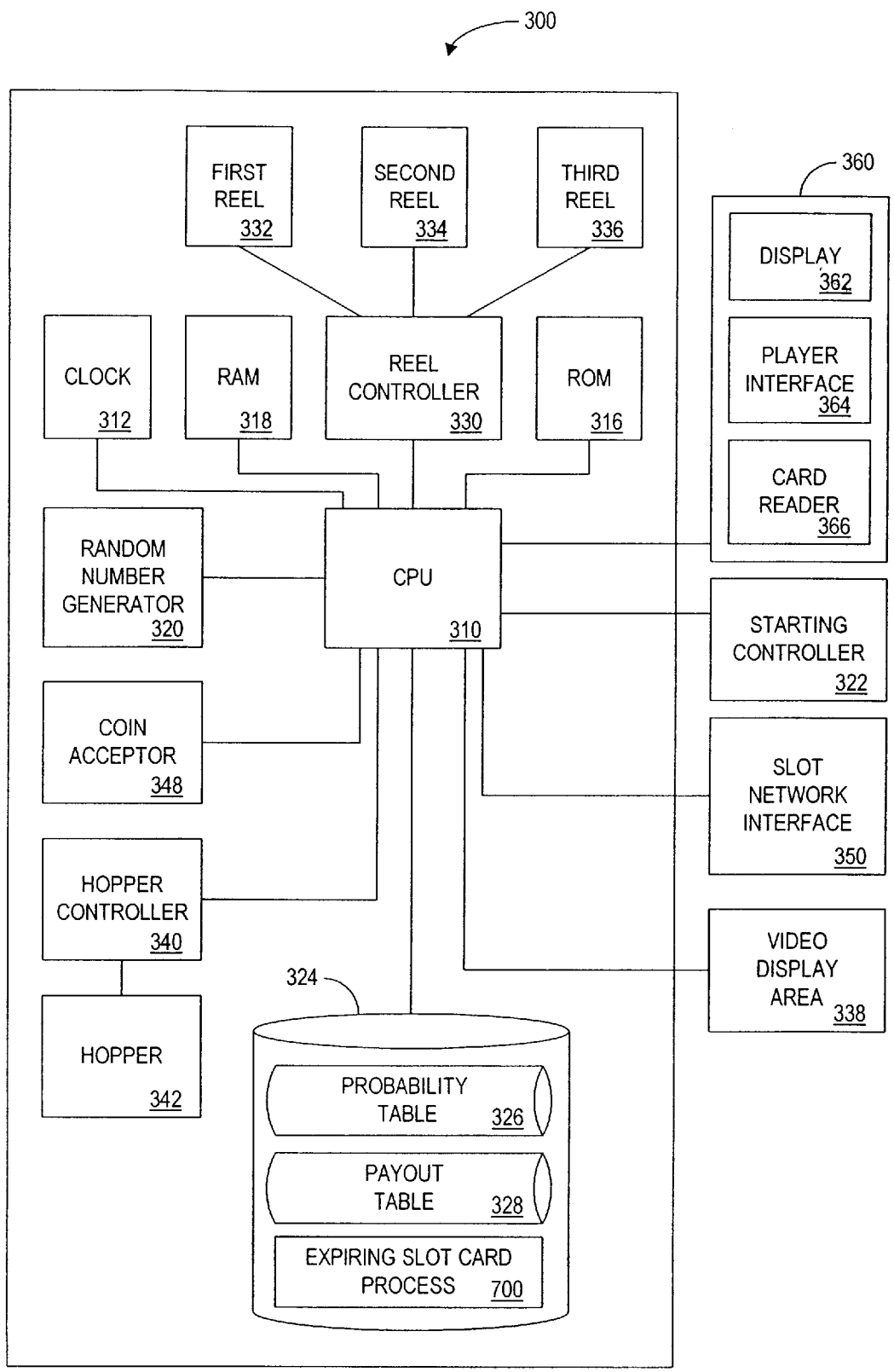
FIG. 3 is a schematic block diagram of an illustrative slot machine of FIG. 1.

FIG. 3 is a block diagram showing the architecture of an illustrative slot machine 300. The slot machine 300 preferably includes certain standard hardware components, such as a CPU 310, a data storage device 324, a ROM 316, a RAM 318, and a clock 312. The CPU 310 is preferably linked to each of the other listed elements, either by means of a shared data bus, or dedicated connections, as shown in FIG. 3. The CPU 310 executes program modules stored in the data storage device 324 or the ROM 316 to perform the processes described below, in a known manner.

As shown in FIG. 3, the data storage device 324 includes a probability table 326 and a payout table 328. The probability table 326 preferably stores the probability that each possible reel combination will result, in a conventional manner. The payout table 328 preferably stores the payout associated with each winning reel combination, in a conventional manner, for a given number of coins wagered by a player. For a more detailed discussion of a suitable slot machine 300, and the associated probabilities and payouts, see J. Regan, Winning at Slot Machines (Citadel Press 1985), incorporated by reference herein.

In addition, as discussed further below in conjunction with FIG. 7, the data storage device 324 preferably includes an expiring slot card process 700. Generally, the expiring slot card process 700 permits a player to utilize an expiration amount associated with an expiring prepaid casino card 400 as a form of payment for slot machine play, provided the player has satisfied any casino-defined requirements for accessing such expiration amounts.

Generally, the player starts the slot machine 300 in a conventional manner by providing a form of payment, for example, by depositing one or more coins by means of a coin acceptor 348, or inserting a credit card, debit card or smart card, and pressing a starting controller 322, such as a "spin reels" button. Thereafter, the CPU 310 initiates the random number generator 320 to generate a number. The CPU 310 looks up the generated random number in the appropriate probability table 326, and retrieves the corresponding reel combination, or game result. The CPU 310 also directs a reel controller 330 to spin the reels 332, 334, 336 and to stop them at a point when a combination of symbols corresponding to the retrieved combination is displayed. Based on the identified slot outcome, and the number of coins wagered, the CPU 310 locates the appropriate payout in the stored payout table 328. When a payout is awarded, the slot machine 300 stores the credits in the random access memory (RAM) 318 and displays the available credits to the player in a video display area 338. A hopper controller 340 is connected to a hopper 342 for dispensing coins. When the player requests to cash out by pushing a button on the slot machine 300, the CPU 310 checks the RAM 318 to see if the player has any credit and, if so, signals the hopper 342 to release an appropriate number of coins into a payout tray (not shown).

A player tracking device 360 is also in communication with the CPU 310. The player tracking device 360 comprises a card reader 366 for reading an expiring prepaid casino card 400 or player identification information stored on a player tracking card (not shown) or both. A player-tracking card is preferably encoded with information to identify the player, in a known manner. In a preferred embodiment, an expiring prepaid casino card 400 can serve as both a prepaid casino card and a player-tracking card. The player-tracking device 360 also preferably includes a display 362, preferably having a touch screen, and a player interface 364. The display 362 may be utilized to indicate any available balance associated with the expiring prepaid casino card 400. Suitable commercially available player card tracking devices include, for example, the Mastercom device available from Bally Manufacturing. (See, for example, U.S. Pat. No. 5,429,361 to Raven et al.). Such player tracking devices include a magnetic card reader and a numeric keypad for entry of player information.

The slot machine 300 also includes a slot network interface 350 that provides a communication path between the slot machine 300 and the slot server 200. Thus, as discussed further below, information may be communicated among the player tracking device 360, slot machine 300 and slot server 200.

In alternative embodiments, the slot machine 300 does not include the reel controller 330, or reels 332, 334, 336. Instead, the video display area 338 graphically displays representations of objects contained in the selected game, such as graphical reels or playing cards. These representations are preferably animated to display playing of the selected game.

Figure 4A:
FIG. 4a shows a front view of an illustrative prepaid slot card.
Figure 4B:
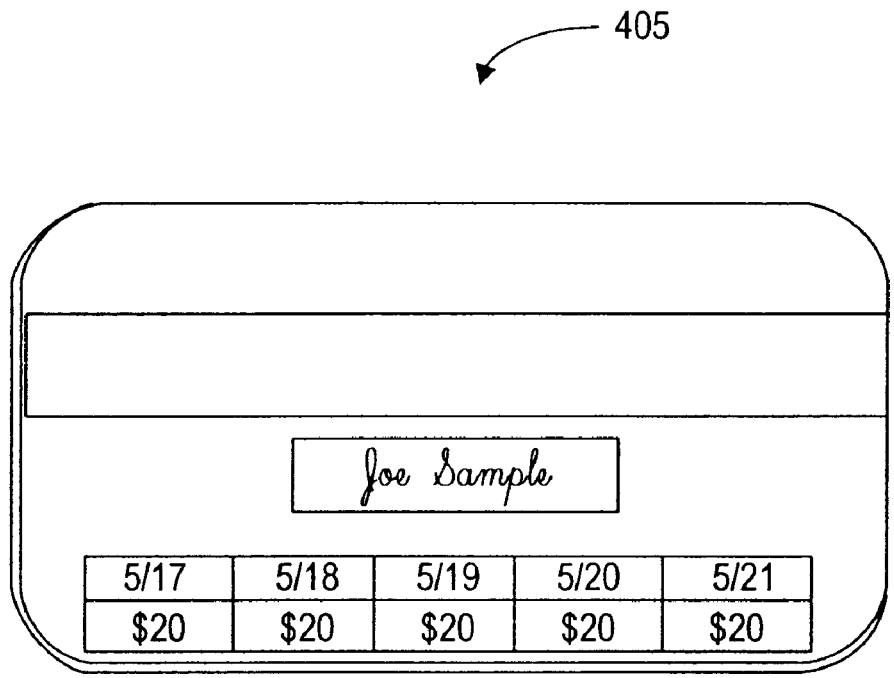

A front view of an illustrative expiring prepaid casino card 400 is shown in FIG. 4a and a rear view 405 of the illustrative expiring prepaid casino card 400 is shown in FIG. 4b. In one embodiment, the front of an expiring prepaid casino card 400 preferably indicates the total value associated with the card 400, as well as the expiration amount and the expiration period. In addition, the rear view 405 of the expiring prepaid casino card 400 preferably contains a field for the signature of the associated player, for security purposes, and a mechanism for allowing a player or the casino 110 to optionally check off each expiration amount as it is utilized for each a expiration period.

As previously indicated, the prepaid card database 500, shown in FIG. 5a, preferably stores account information for each prepaid casino card 400, including the total account balance and predefined expiration amounts for each expiration period. The prepaid card database 500 shown in FIG. 5a accommodates expiring prepaid casino accounts having fixed predefined expiration amounts which expire over each of a plurality of fixed predefined expiration periods.

Figure 5B:
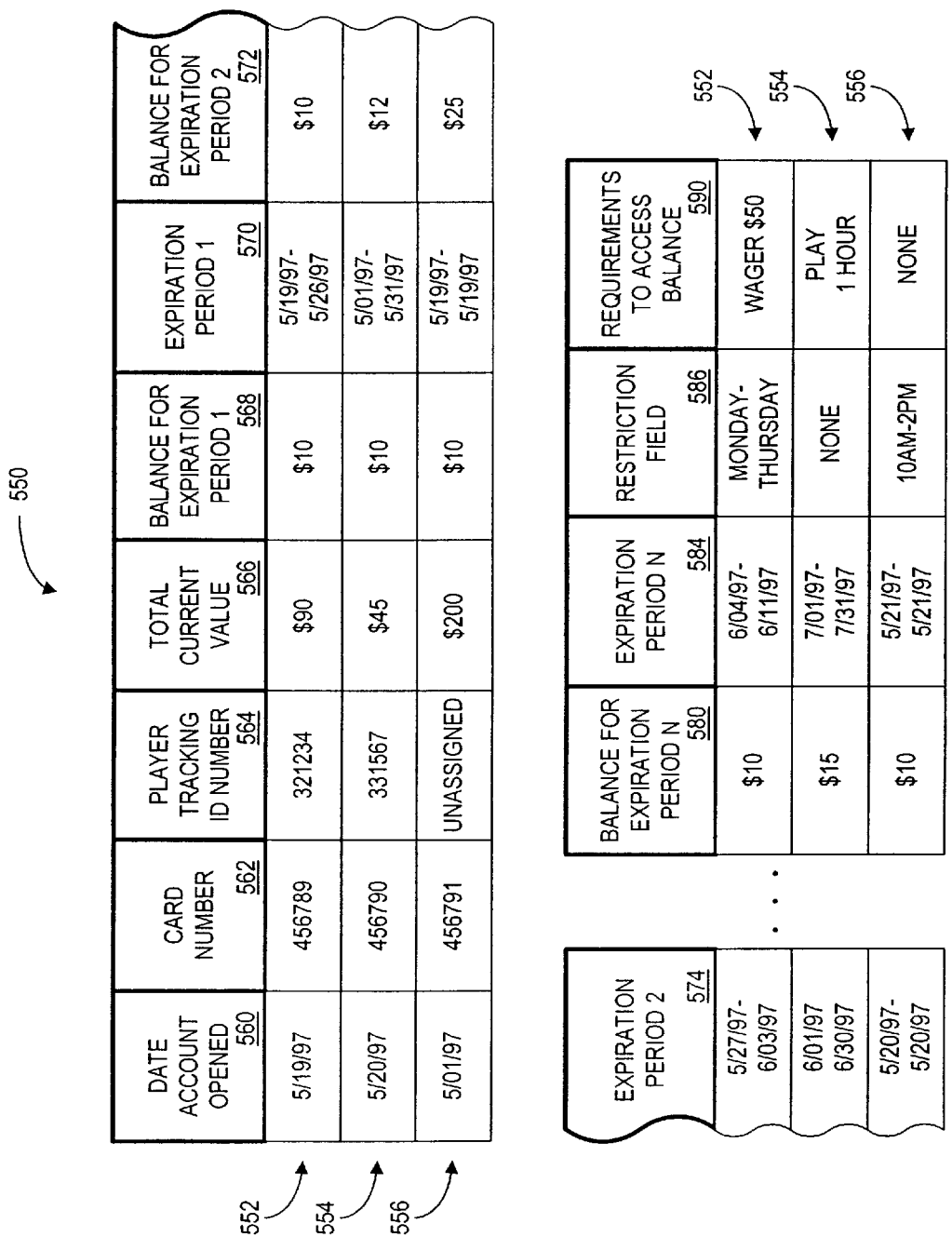
FIG. 5b illustrates a sample table from an alternative embodiment of the prepaid card database of FIG. 2.

As shown in FIG. 5a, the prepaid card database 500 maintains a plurality of records, such as records 502–506, each associated with a different expiring prepaid casino account. For each expiring prepaid casino account identified by card number in field 512, the prepaid card database 500 includes the date on which the account was opened in field 510, and the corresponding player tracking identification number, if different, assigned to the player in field 514. In addition, the prepaid card database 500 preferably maintains the current balance, expiration amount per expiration period, expiration period duration, balance remaining for current expiration period and balance reset date, in fields 516 through 524, respectively. In addition, any restrictions and play requirements that the player must satisfy before being permitted to access an expiration amount are set forth in fields 526 and 530. In an alternate embodiment, the prepaid card database can be embodied as shown in FIG. 5b, to permit variable predefined expiration amounts which expire over each of a plurality of variable predefined expiration periods. Thus, the alternative prepaid card database 550, shown in FIG. 5b, preferably stores account information for each prepaid casino card 400. For each expiring prepaid casino account identified by card number in field 562, the prepaid card database 550 includes the date on which the account was opened in field 560, and the corresponding player tracking identification number, if different, assigned to the player in field 564. In addition, the alternative prepaid card database 550 preferably maintains the total current balance in field 566. Thereafter, the alternative prepaid card database 550 preferably includes a pair of fields for each available expiration period, with each pair of fields containing the balance for each expiration period, and the date range of the expiration period, such as fields 568 and 570 for the first expiration period, fields 572 and 574 for the second expiration period and fields 580 and 584 for the $n^{th}$ expiration period. In addition, any restrictions and play requirements which the player must satisfy before being permitted to access an expiration amount are set forth in fields 586 and 590, respectively. In this manner, the alternative prepaid card database 550 provides greater flexibility to permit variability for both the expiration amounts and the expiration periods.

Figure 6A:
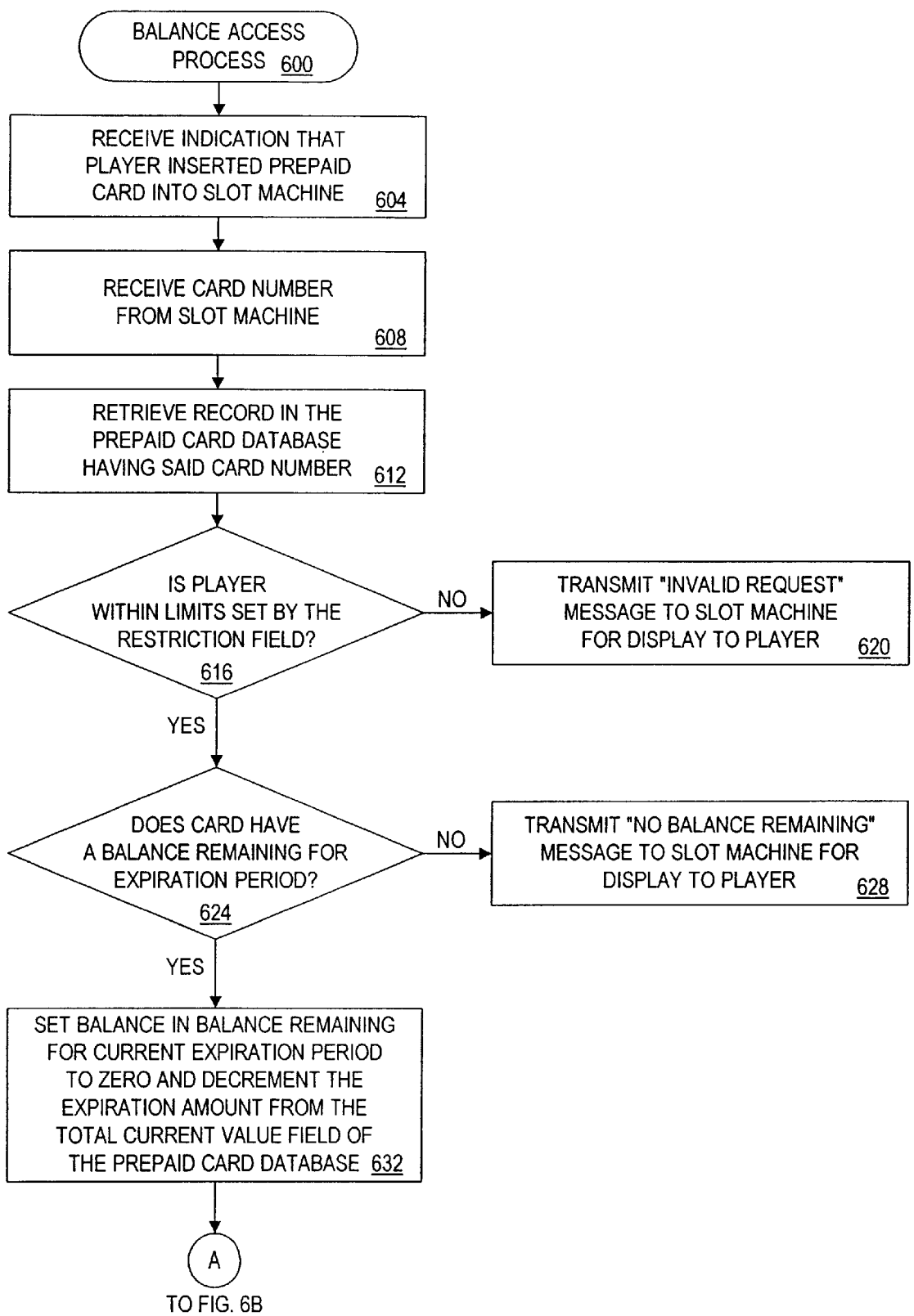
FIGS. 6a and 6b, collectively, are a flow chart describing an exemplary balance access process as implemented by the slot server of FIG. 2.
Figure 6B:
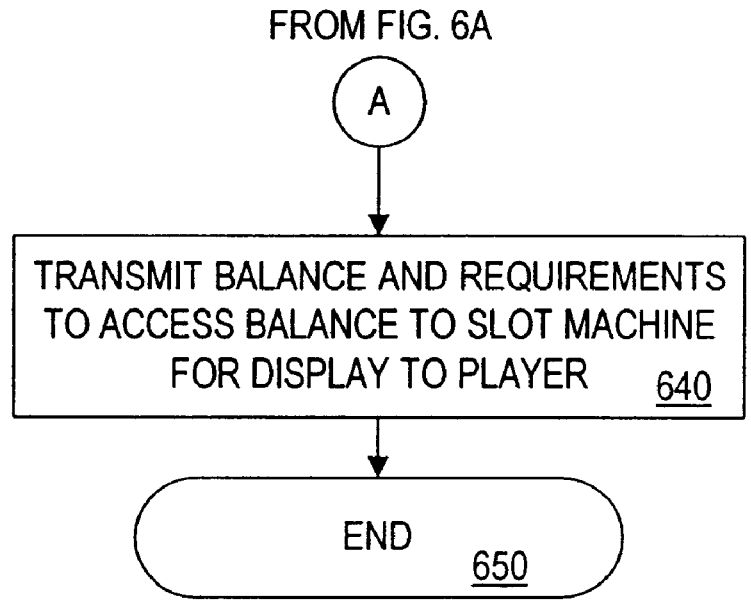

As previously indicated, the slot server 200 preferably executes a balance access process 600, shown in FIGS. 6a and 6b, to receive requests from a player to access a balance associated with a prepaid casino card 400 and to release a predefined expiration amount to a player, if available for the current expiration period, provided any associated restrictions have been met. Thus, the balance access process 600 is preferably initiated during step 604 upon receipt of an indication from a slot machine 300 that a player has inserted an expiring prepaid casino card 400 into the slot machine 300. Thereafter, the slot server 200 preferably receives an indication of the card number from the slot machine 300 during step 608.

The card number received during the previous step is then utilized to retrieve the corresponding record in the prepaid card database 500 during step 612. A test is then performed during step 616 to determine if the player is within the limits set by the restrictions field 526 of the prepaid card database 500. If it is determined during step 616 that the player is not within the limits set by the restrictions field 526 of the prepaid card database 500, then an "invalid request" message is transmitted to the slot machine 300 during step 620 for display to the player. If, however, it is determined during step 616 that the player is within the limits set by the restrictions field 526 of the prepaid card database 500, then the balance in the balance remaining for current expiration period field 522 is set to zero during step 632 and the expiration amount is decremented from the total current value field 516 of the prepaid card database 500. It is noted that for an implementation utilizing the alternative expiring prepaid card database 550, the balance in the appropriate balance remaining for expiration period n field, such as fields 568, 572, for the appropriate expiration period, is set to zero during step 632 and the expiration amount is decremented from the total current value field 566 of the alternative prepaid card database 550.

Thereafter, the expiration amount balance and any play requirements to access the balance, as retrieved from field 530 or 590 of the prepaid card database 500, 550, as appropriate, are transmitted to the slot machine 300 during step 640 (FIG. 6b), before program control terminates during step 650. In this manner, the functionality for ensuring compliance with any requirements to access the balance has been illustratively placed in the slot machine 300, as discussed further below in conjunction with FIG. 7.

Figure 7:
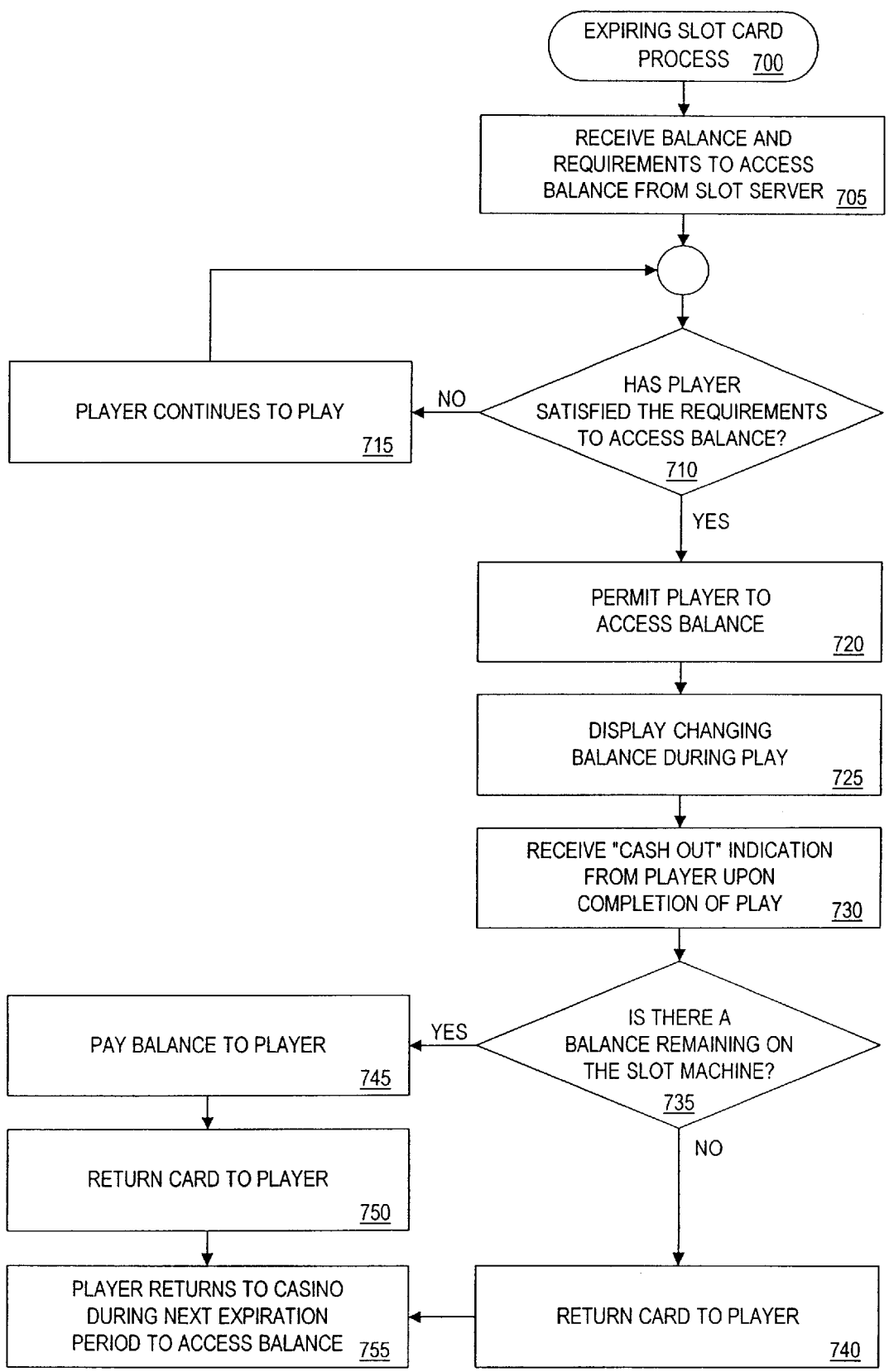
FIG. 7 is a flow chart describing an exemplary expiring slot card process as implemented by the slot machine of FIG. 3.

As previously indicated, the slot machine 300 preferably executes an expiring slot card process 700, shown in FIG. 7, to permit a player to utilize an expiration amount associated with an expiring prepaid casino card 400 as a form of payment for slot machine play, provided the player has satisfied any casino-defined requirements for accessing such expiration amounts. Thus, the expiring slot card process 700 is initiated during step 705 upon receipt of the expiration amount balance and any requirements to access the balance which were transmitted by the slot server 200 during step 640 of the balance access process 600.

Thereafter, a test is performed during step 710 to determine if the player has satisfied any requirements to access the balance. If it is determined during step 710 that the player has not satisfied any requirements to access the balance, then the player is required to continue playing during step 715 until the requirements are satisfied. If, however, it is determined during step 710 that the player has satisfied any requirements to access the balance, then the player is permitted to access the expiration amount balance during step 720.

The changing balance is preferably displayed to the player during step 725 as play continues. Upon receipt of a "cash out" indication from the player following completion of play, during step 730, a test is performed during step 735 to determine if there is a remaining balance on the slot machine 300. If it is determined during step 735 that there is not a remaining balance on the slot machine 300, then the expiring prepaid casino card 400 is returned to the player during step 740, and program control proceeds to step 755. If, however, it is determined during step 735 that there is a remaining balance on the slot machine 300, then the balance is paid to the player during step 745 and the expiring prepaid casino card 400 is returned to the player during step 750. Finally, as indicated during step 755, the player is required to return to the casino 110 during the next expiration period to access the next expiration amount balance.

Figure 8:
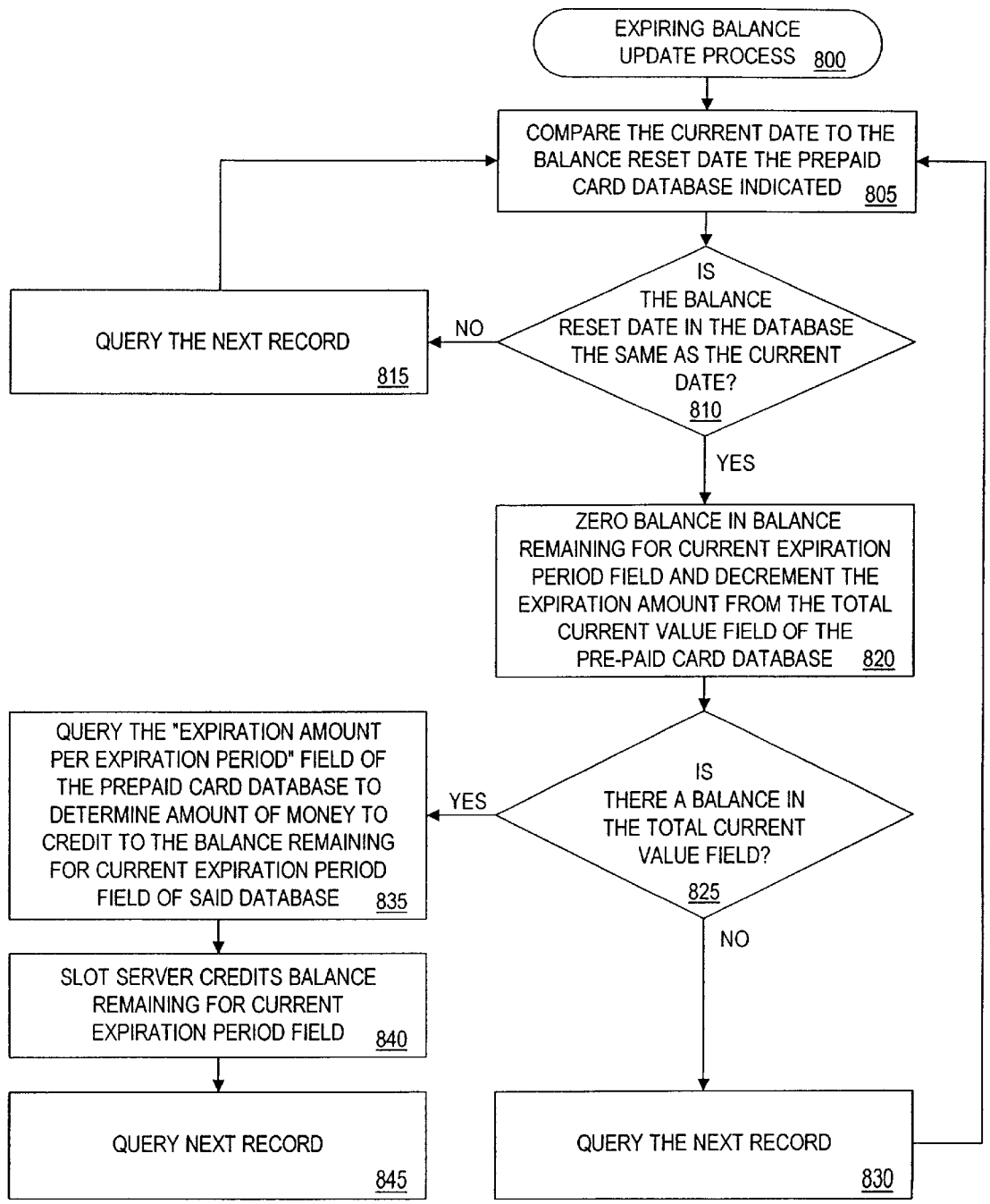
FIG. 8 is a flow chart describing an expiring balance update process as implemented by the slot server of FIG. 2.

As discussed above, the slot server 200 preferably periodically executes an expiring balance update process 800, shown in FIG. 8, to cause any remaining expiration amount is associated with the expiring prepaid casino card 400 to automatically expire if not utilized within the predefined expiration period. Thus, upon execution, the expiring balance update process 800 initially compares the current date to the balance reset date recorded in field 524 of the prepaid card database 500. A test is then performed during step 810 to determine if the balance reset date in the prepaid card database 500 is equal to the current date. If it is determined during step 810 that the balance reset date in the prepaid card database 500 is not equal to the current date, then there is no balance to expire for the current record and the next record is queried during step 815 to be processed in the manner described above. If, however, it is determined during step 810 that the balance reset date in the prepaid card database 500 is equal to the current date, then any balance in the balance remaining for current expiration period field 522 is set to zero during step 820 and the expiration amount is decremented from the total current value field 516 of the prepaid card database 500.

Thereafter, a test is performed during step 825 to determine if there is a balance remaining in the total current balance field 516. If it is determined during step 810 that there is no balance remaining in the total current balance field 516, then the next record is queried during step 830 to be processed in the manner described above. If, however, it is determined during step 825 that there is a balance remaining in the total current balance field 516, then the expiration amount per expiration period field 518 is queried during step 835 to determine the amount of money to credit to the balance remaining for current expiration period field 522 of the prepaid card database 500. Thereafter, the balance remaining for current expiration period field 522 of the prepaid card database 500 is credited with the appropriate amount during step 840. Thereafter, the next record is queried during step 845 to be processed in the manner described above.

It is to be understood that the embodiments and variations shown and described herein are merely illustrative of the principles of this invention and that various modifications may be implemented by those skilled in the art without departing from the scope and spirit of the invention.

We claim:

1. A method for allowing a player to play a slot machine using a prepaid casino card having an associated monetary amount, said method comprising:

accessing a data record associated with said prepaid casino card for storing said monetary amount, said prepaid casino card having an associated player requirement;

permitting, only after said player has satisfied said player requirement, said player to play said slot machine using at least one of a plurality of predefined portions of said monetary amount, each of said plurality of predefined portions of said monetary amount having a corresponding predefined expiration period; and expiring one of said plurality of predefined portions of said monetary amount if said one of said plurality of predefined portions is not utilized in its corresponding expiration period.

2. The method according to claim 1, wherein each of said plurality of predefined portions of said monetary amount automatically expires if not utilized in its corresponding expiration period.

3. The method according to claim 1, further comprising providing said player with at least one excused absence to prevent an expiration of one of said plurality of predefined portions of said monetary amount not utilized in its corresponding time period.

4. The method according to claim 1, wherein at least one of said plurality of predefined portions of said monetary amount is fixed.

5. The method according to claim 1, wherein at least one of said plurality of predefined portions of said monetary amount is variable.

6. The method according to claim 1, wherein at least two of said plurality of predefined portions of said monetary amount are variable and said at least two variable predefined portions of said monetary amount increase over their respective corresponding expiration periods.

7. The method according to claim 1, wherein at least two of said plurality of predefined portions of said monetary amount are variable and said at least two variable predefined portions of said monetary amount increase in a predefined progression over their respective corresponding expiration periods, regardless of whether any one of said at least two variable predefined portions of said monetary amount is actually utilized during its corresponding expiration period.

8. The method according to claim 1, wherein at least one of said plurality of predefined portions of said monetary amount is variable and said at least one of said plurality of predefined portions of said monetary amount is based on the time at which said at least one of said plurality of predefined portions is accessed.

9. The method according to claim 1, wherein at least one of said plurality of predefined portions of said monetary amount is variable and said at least one of said plurality of predefined portions of said monetary amount is based on at least one external event.

10. The method according to claim 1, wherein at least two of said plurality of predefined portions of said monetary amount are variable and said at least two of said plurality of predefined portions of said monetary amount can be randomly distributed among a plurality of said predefined expiration periods.

11. The method according to claim 1, wherein a bonus amount can be added to one or more of said plurality of predefined portions of said monetary amount based on a level of play associated with said player.

12. The method according to claim 1, wherein a bonus amount can be added to one or more of said plurality of predefined portions of said monetary amount based on a quality of play associated with said player.

13. The method according to claim 1, further comprising increasing said monetary amount with a jackpot based on slot machine play that expires in predefined portions of predefined expiration periods.

14. The method according to claim 1, further comprising establishing said monetary amount with a jackpot based on slot machine play that expires in predefined portions over predefined expiration periods.

15. The method according to claim 1, further comprising evaluating one or more restrictions which must be satisfied before said player can access each of said plurality of predefined portions of said monetary amount.

16. A method for allowing a player to play a slot machine using a prepaid casino card having an identifier and an associate monetary amount, said method comprising:
   receiving an identifier associated with said prepaid casino card, said prepaid casino card having an associated player requirement;
   utilizing said identifier to access said associated monetary amount from a data record, said monetary amount including a plurality of predefined portions, each of said plurality of predefined portions being associated with one of a plurality of predefined expiration periods; and
   permitting, only after said player has satisfied said player requirement, said player to initiate play using at least one of said plurality of predefined portions of said monetary amount, said at least one of said plurality of predefined portions of said monetary amount expiring if said at least one of said plurality of predefined portions of said monetary amount is not utilized in its associated predefined expiration period.

17. The method according to claim 16, wherein said at least one of said predefined portions of said monetary amount automatically expires if not utilized in its associated expiration period.

18. The method according to claim 16, further comprising providing said player with one or more excused absences to prevent an expiration of a predefined portion of said monetary amount not utilized in its corresponding expiration period.

19. The method according to claim 16, wherein at least one of said plurality of predefined portions of said monetary amount is fixed.

20. The method according to claim 16, wherein at least one of said plurality of predefined portions of said monetary amount is variable.

21. The method according to claim 16, wherein at least two of said plurality of predefined portions of said monetary amount are variable and said at least two variable predefined portions of said monetary amount increase over their respective associated expiration periods.

22. The method according to claim 16, wherein at least one of said plurality of predefined portions of said monetary amount is variable and each of said at least one variable predefined portion of said monetary amount is based on the time at which said at least one variable predefined portion is accessed.

23. The method according to claim 16, wherein at least one of said plurality of predefined portions of said monetary amount is variable and said at least one of said plurality of predefined portions of said monetary amount is based on external events.

24. The method according to claim 16, wherein at least two of said plurality of predefined portions of said monetary amount are variable and said at least two of said plurality of predefined portions of said monetary amount can be randomly distributed among a plurality of said predefined expiration periods.

25. The method according to claim 16, wherein a bonus amount can be added to at least one of said predefined portions of said monetary amount based on a level of play associated with said player.

26. The method according to claim 16, wherein a bonus amount can be added to at least one of said predefined portions of said monetary amount based on a quality of play associated with said player.

27. The method according to claim 16, further comprising increasing said monetary amount with a jackpot based on slot machine play that expires in predefined portions over predefined expiration periods.

28. The method according to claim 16, further comprising establishing said monetary amount with a jackpot based on slot machine play that expires in predefined portions over predefined expiration periods.

29. The method according to claim 16, further comprising evaluating one or more restrictions which must be satisfied before said player can access each of said plurality of predefined portions of said monetary amount.

30. A system for processing a prepaid casino card, said prepaid casino card having an associated monetary amount and an associated player, said processing system comprising:
   means for accessing a data record associated with said prepaid casino card and storing said associated monetary amount, wherein said prepaid casino card has an associated player requirement;
   a processor for making a plurality of predefined portions of said monetary amount available to said associated player for play of a slot machine only after said associated player has satisfied said player requirement, each of said plurality of predefined portions of said monetary amount having a corresponding expiration period; and
   means for automatically expiring one of said plurality of predefined portions of said monetary amount if said one of said plurality of predefined portions is not utilized in its corresponding expiration period.

31. The system according to claim 30, further comprising means for providing said player with at least one excused absence to prevent an expiration of one of said plurality of predefined portions of said monetary amount not utilized in its corresponding expiration period.

32. The system according to claim 30, wherein at least one of said plurality of predefined portions of said monetary amount is fixed.

33. The system according to claim 30, wherein at least one of said plurality of predefined portions of said monetary amount is variable.

34. The system according to claim 30, wherein at least two of said plurality of predefined portions of said monetary amount are variable and said at least two variable predefined portions of said monetary amount increase over their respective corresponding expiration periods.

35. The system according to claim 30, wherein at least one of said plurality of predefined portions of said monetary amount is variable and said at least one of said plurality of predefined portions of said monetary amount is based on the time at which said at least one of said plurality of predefined portions is accessed.

36. The system according to claim 30, wherein at least one of said plurality of predefined portions of said monetary amount is variable and said at least one of said plurality of predefined portions of said monetary amount is based on at least one external event.

37. The system according to claim 30, wherein at least two of said plurality of predefined portions of said monetary amount are variable and said at least two of said predefined portions of said monetary amount can be randomly distributed among a plurality of said predefined expiration periods.

38. The system according to claim 30, wherein a bonus amount can be added to one or more of said predefined portions of said monetary amount based on a level of play associated with said player.

39. The system according to claim 30, wherein a bonus amount can be added to one or more of said predefined portions of said monetary amount based on a quality of play associated with said player.

40. The system according to claim 30, further comprising means for increasing said monetary amount with a jackpot based on slot machine play that expires in predefined portions over predefined expiration periods.

41. The system according to claim 30, further comprising means for establishing said monetary amount with a jackpot based on slot machine play that expires in predefined portions over predefined expiration periods.

42. The system according to claim 30, further comprising means for evaluating one or more restrictions which must be satisfied before said player can access each of said plurality of predefined portions of said monetary amount.

43. A method for playing a slot machine using a prepaid casino card having an associated monetary amount, said method comprising the steps of:
receiving a prepaid casino card having a monetary amount and a player requirement associated therewith;
completing said player requirement;
inserting said prepaid casino card into said slot machine to initiate play of said slot machine; and
obtaining access to a predefined portion of said monetary amount for each of a plurality of corresponding predefined expiration periods, each said predefined portion of said monetary amount expiring if said predefined portion is not utilized in its corresponding expiration period.

44. The method according to claim 43, further comprising the step of providing said player with one or more excused absences to prevent an expiration of a predefined portion of said monetary amount if said predefined portion of said monetary amount is not utilized in its corresponding expiration period.

45. A method for establishing a prepaid casino card having an associated monetary amount, said method comprising:

providing said prepaid casino card to a player at a price, said prepaid casino card having an associated player requirement; and
establishing a data record associated with said prepaid casino card for storing said monetary amount, each of a plurality of predefined portions of said monetary amount being accessible by said player, only after said player has satisfied said player requirement, for a corresponding predefined expiration period and expiring if said predefined portion is not utilized in its corresponding expiration period.

46. The method of claim 45 further comprising permitting said customer to specify said plurality of predefined portions of said monetary amount.

47. The method of claim 45 further comprising permitting said customer to specify said predefined expiration periods.

48. The method of claim 45 further comprising the step of calculating said price for said prepaid casino card based on said plurality of predefined portions of said monetary amount and said predefined expiration periods.

49. A method for establishing a prepaid casino card having an associated monetary amount, said method comprising the steps of:
providing said prepaid casino card to a player at a price, said prepaid casino card having an associated player requirement;
receiving a customer-defined specification of a plurality of predefined portions of said monetary amount, wherein each of said plurality of predefined portions of said monetary-amount may be accessible for a corresponding customer-defined expiration period only after said player has satisfied said player requirement;
calculating a price for said prepaid casino card based on said predefined portions of said monetary amount; and
establishing a data record associated with said prepaid casino card for storing said customer-defined portions of said monetary amount, each of said predefined portions of said monetary amount expiring if not utilized in its corresponding expiration period.

50. A medium storing instructions adapted to be executed by a processor to perform a method for allowing a player to play a slot machine using a casino card having an associated monetary amount, said method comprising:
accessing a data record, associated with a casino card, said data record storing a monetary amount and a player requirement;
permitting, only after the player has satisfied said player requirement, the player to play the slot machine using at least one of a plurality of predefined portions of the monetary amount, each of said plurality of predefined portions having a corresponding predefined expiration period; and
expiring one of said plurality of predefined portions of said monetary amount if said one of said plurality of predefined portions is not utilized in its corresponding expiration period.

51. A medium storing instructions adapted to be executed by a processor to perform a method for allowing a player to play a slot machine using a casino card having an identifier and an associated monetary amount, said method comprising:
receiving an identifier associated with a casino card, said casino card having an associated player requirement;
utilizing the identifier to access the associated monetary amount, the monetary amount including a plurality of predefined portions, each of the plurality of predefined portions being associated with one of a plurality of predefined expiration periods; and permitting the player to initiate play using at least one of the plurality of predefined portions only after said player has satisfied said player requirement, the at least one of the plurality of predefined portions of the monetary amount expiring if the at least one of the plurality of predefined portions is not utilized in its associated predefined expiration period.

52. A computer-readable medium that stores data accessible by a program executable on a data processing system, the data being organized according to a data structure that includes:

a player identifier data object representing a player; and a plurality of portion data objects accessible from said player identifier data object, each of the plurality of portion data objects representing a portion of a monetary amount available to the player to play a slot machine only after the player has satisfied a player requirement associated with said plurality of portion data objects, wherein each of said plurality of portion data objects is associated with a predefined expiration period.

53. A method for allowing a player to play a slot machine using a casino card having an associated monetary amount, comprising:

accessing a data record, associated with a casino card, for storing the monetary amount and a player requirement associated with the casino card;

permitting, only after the player has satisfied the player requirement, the player to play a slot machine using a first predefined portion of the monetary amount for a first expiration period, said first expiration period starting on a first start date and ending on a first end date;

expiring the first portion of the monetary amount if said first portion is not utilized in said first expiration period; and permitting the player to play the slot machine using a second predefined portion of the monetary amount for a second expiration period, said second expiration period starting on a second start date and ending on a second end date, wherein said second start date is on or after said first end date.

54. A method for allowing a player to play a slot machine using a casino card having an associated monetary amount, comprising:

accessing a data record associated with a casino card, said data record storing a monetary amount and a player requirement;

permitting a player to play a slot machine using at least one of a plurality of predetermined portions of said monetary amount, only after the player has satisfied said player requirement, wherein each of said plurality of predetermined portions of said monetary amount having a corresponding predefined expiration period; and expiring a remainder of at least one of said plurality of predetermined portions of said monetary amount if said at least one of said plurality of predetermined portions is not completely used in its corresponding expiration period.

55. A method for allowing a player to play a slot machine using a casino card having an identifier and an associated monetary amount, comprising:

receiving an identifier associated with a casino card, said casino card having an associated player requirement;

utilizing said identifier to access an associated monetary amount, said monetary amount including a plurality of predefined portions, each of said plurality of predefined portions being associated with one of a plurality of predefined expiration periods; and permitting, only after said player has satisfied said player requirement, said player to initiate play one of said plurality of predefined portions of said monetary amount, any unused part of said one of said plurality of predefined portions of said monetary amount expiring if said one of said plurality of predefined portions of said monetary amount is not completely used in the predefined expiration period associated with said one of said plurality of predefined portions of said monetary amount.

56. A method for establishing a casino card having an associated monetary amount, comprising:

providing a casino card to a player, said casino card having an associated player requirement; and establishing a data record associated with said casino card and capable of storing a monetary amount, each of a plurality of predetermined portions of said monetary amount being accessible by said player, only after said player has satisfied said player requirement, for a corresponding predefined expiration period and expiring if any part of said predetermined portion is not utilized in its corresponding expiration period.

* * * * *